US012771538B2

(12) United States Patent
Eldefrawy et al.

(10) Patent No.: US 12,771,538 B2
(45) Date of Patent: Oct. 20, 2026

(54) SYSTEMS, METHODS, AND COMPUTER-READABLE MEDIA FOR SELECTIVELY OR FULLY PROTECTING ELECTRONIC AND DIGITALLY SIGNED ELECTRONIC DOCUMENTS AND SPECIFYING ACCESS THEREOF

(71) Applicants: Karim Eldefrawy, Menlo Park, CA (US); Benjamin Terner, New York, NY (US); Michael James Mullen, Antigonish (CA); Mason Lee, Los Angeles, CA (US); Dana Charles Wheeler, Santa Monica, CA (US)

(72) Inventors: Karim Eldefrawy, Menlo Park, CA (US); Benjamin Terner, New York, NY (US); Michael James Mullen, Antigonish (CA); Mason Lee, Los Angeles, CA (US); Dana Charles Wheeler, Santa Monica, CA (US)

(73) Assignee: Confidencial, Inc., Menlo Park, CA (US)

( * ) Notice: Subject to any disclaimer, the term of this patent is extended or adjusted under 35 U.S.C. 154(b) by 0 days.

(21) Appl. No.: 19/091,064

(22) Filed: Mar. 26, 2025

(65) Prior Publication Data

US 2025/0310098 A1 Oct. 2, 2025

Related U.S. Application Data

(60) Provisional application No. 63/570,966, filed on Mar. 28, 2024.

(51) Int. Cl.
*H04L 9/08* (2006.01)
*H04L 9/32* (2006.01)

(52) U.S. Cl.
CPC ............ *H04L 9/088* (2013.01); *H04L 9/3247* (2013.01)

(58) Field of Classification Search
CPC .............................. H04L 9/088; H04L 9/3247
See application file for complete search history.

(56) References Cited

U.S. PATENT DOCUMENTS

| | | | | |
|---|---|---|---|---|
| 10,412,098 | B2 * | 9/2019 | Campagna | H04L 9/3234 |
| 10,574,440 | B2 * | 2/2020 | Egorov | H04L 9/14 |
| 10,756,906 | B2 * | 8/2020 | Toth | H04L 9/0894 |
| 11,552,802 | B2 * | 1/2023 | Bansal | H04L 67/02 |
| 11,743,189 | B2 * | 8/2023 | Rosenberg | H04L 47/125 |
| 12,192,318 | B2 * | 1/2025 | Kuang | H04L 9/0618 |
| 12,563,067 | B2 * | 2/2026 | Shen | H04L 63/1425 |
| 2022/0385644 | A1 * | 12/2022 | Puzeris | G06F 21/445 |
| 2024/0163088 | A1 * | 5/2024 | Leoutsarakos | H04L 9/3026 |
| 2025/0007954 | A1 * | 1/2025 | Sawal | H04L 63/20 |
| 2025/0310098 | A1 * | 10/2025 | Eldefrawy | H04L 9/088 |

* cited by examiner

*Primary Examiner* — Viral S Lakhia
(74) *Attorney, Agent, or Firm* — Van Court & Aldridge LLP

(57) ABSTRACT

Systems, methods, and computer-readable media for selectively or fully protecting electronically or digitally signed electronic documents and specifying access thereof are provided. The documents are securely maintained throughout the entirety of an electronic signature service workflow by using a cryptographically-augmented private software as a service scheme.

16 Claims, 8 Drawing Sheets

SYSTEMS, METHODS, AND COMPUTER-READABLE MEDIA FOR SELECTIVELY OR FULLY PROTECTING ELECTRONIC AND DIGITALLY SIGNED ELECTRONIC DOCUMENTS AND SPECIFYING ACCESS THEREOF

CROSS-REFERENCE TO A RELATED APPLICATION

This application claims priority to U.S. Provisional Patent Application No. 63/570,66383, filed Mar. 28, 2024, the disclosure of which is incorporated by reference in its entirety.

TECHNICAL FIELD

This can relate to systems, methods, and computer-readable media for protecting electronically and digitally signed electronic documents and specifying access thereof.

BACKGROUND

Conventional electronic signature services such as DocuSign® and DropBox Sign™ enable electronic documents to be digitally signed and transmitted to the appropriate parties. Although these electronic signature services are convenient and facilitate execution of digital documents, these services provide little or no security for the digital documents nor provide originator specified control over how such documents are accessed. Accordingly, more secure and feature rich electronic signature services are needed.

SUMMARY

Systems, methods, and computer-readable media for protecting digitally signed electronic documents and specifying access thereof are provided. The documents are securely maintained throughout the entirety of an electronic signature service workflow by using a cryptographically-augmented private software as a service scheme.

This Summary is provided to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The above and other aspects of the disclosure, its nature, and various features will become more apparent upon consideration of the following detailed description, taken in conjunction with the accompanying drawings, in which like reference characters may refer to like parts throughout, and in which.

DETAILED DESCRIPTION

Figure 1:
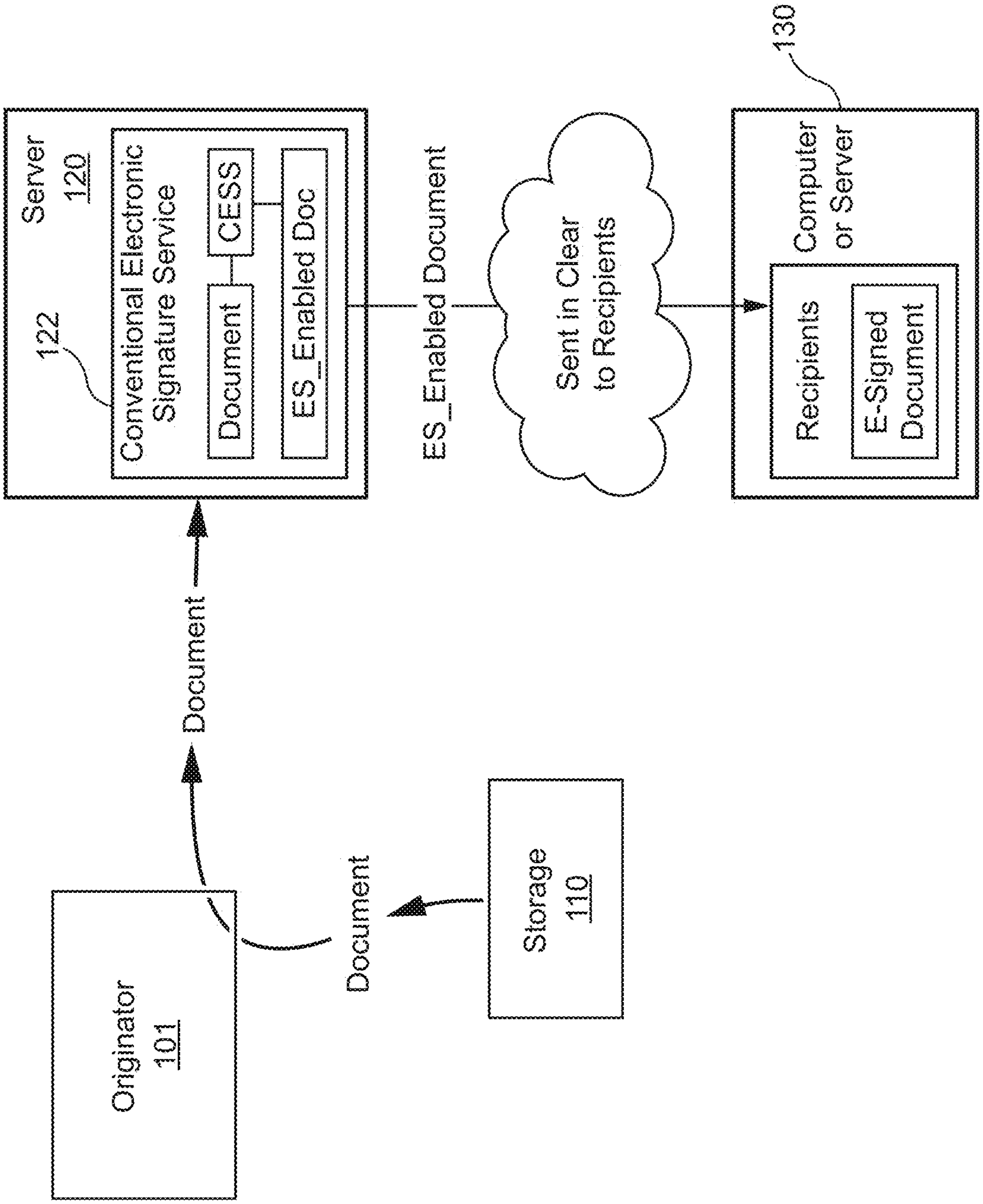
FIG. 1 (PRIOR ART)
FIG. 1 shows a conventional workflow for securing an electronic or digital signature of a document.

Systems, methods, and computer readable media for protecting and providing access control of electronic and digital assets are provided and described with reference to FIGS. 2-6. The protection and access control are provided by a cryptographically-augmented private software as a service (CAPS) scheme. The CAPS scheme can be used for electronic and digital signing, chained approvals, timed-release, access control, policy-based protection, and forwarding and exposure mitigation.

As defined herein, a digital asset can be a product provided by a SaaS. In one embodiment, a digital asset can be an electronically signed document or a digitally signed document. An electronic signature can be a signature that is applied electronically. The electronic signature can be a symbol, a stamp, a representation of a name, a scan of a handwritten signature, or any other mark that shows an intent to sign a document. A digital signature is a form of electronic signature with additional security layers (e.g., a cryptographic digital signature).

As defined herein, an enterprise typically refers to a business or company, and in some embodiments, the enterprise can include one or more individuals.

As defined herein, an Enterprise Identity Provider (EIP) refers to an enterprise's identity directory. Any general identity directory that is compliant with standards such as OpenID and/or Security Assertion Markup Language (SAML) and/or System for Cross-domain Identity Management (SCIM) may be used. Examples of commercially available identity directories can include Active Directory (AD), Azure AD, or Okta, or a combination thereof. The EIP can be the source of truth for individual accounts, roles, attributes, and group accounts in the enterprise deploying the system. Individual accounts, roles, and group accounts that exist in an EIP can be made available to CAPS embodiments discussed herein. The CAPS embodiments can map protection policies set by administrators or users of the EIP to be applied to digital assets. For example, a policy can be defined such that a digital asset (e.g., a document or form) process by the CAPS is made visible (partially or fully) only to subsets or combinations of such individual accounts, roles, and groups.

As defined herein, an Enterprise Back-end Storage (EBS) can be local storage in the enterprise's data center or storage in a public cloud but under the enterprise's tenant in such a cloud. For example, EBS can be implemented on commercially available services such Amazon Web service (AWS) S3, Azure Blob cloud storage, Google Drive, Box, Dropbox, or Microsoft OneDrive. The EBS can also be a distributed storage on a blockchain or similar system such as an InterPlanetary File System (IPFS).

As defined herein, an Enterprise Key Server (EKS) refers to a component that is deployed in the enterprise's local or cloud infrastructure to host the private keys used for decryption and cryptographic/digital signing, if protection or authentication (respectively) of documents or digital objects is also required.

As defined herein, a CAPS Enabling Service can refer to the operator of software and/or infrastructure needed to enable CAPS scheme workflows according to various embodiments described herein.

As defined herein, Cloud Signing and Compute Workflow Enabling Service (CSWES) can refer to the operator of any additional software and/or infrastructure needed to enable the workflows of e-signatures, digital signatures, protection of digital objects, and time-release protection of digital objects. CSWES can be a specific implementation of a CAPS enabling service. For time-release protection of digital objects, the CSWES can be responsible for ensuring that an object will be released publicly after a certain time, because the CSWES commits the required computation resources to unlock the object's timed encryption.

As defined herein, Cloud Infrastructure Provider (CIP) can refer to a public cloud provider. Commercial examples of CIPs can include AWS, Azure, or Google Compute. The enterprise may be using the cloud storage of such a CIP as storage backend for use in embodiments discussed herein. An enterprise tenant may deploy its EKS on a CIP if it chooses not to deploy the EKS locally or on an on-premises data server.

FIG. 1 shows a conventional workflow for securing a digital signature of a document. FIG. 1 shows originator 101, storage 110, server 120 running a conventional electronic signature service 122, and computer or server 130. In the convention workflow, originator 101 uploads a document (from storage 110) to server 120. This upload of the document to server 120 is undesirable because the originator is providing a potentially confidential document (e.g., contract, intellectual property, agreements, etc.) to the third party running conventional electronic signature service 122. Attackers who comprise such third parties can then obtain the originator's document and any other uploaded data. In addition, this workflow exposes the originator to significant third party risks. Yet another problem with this workflow is that the originator has no control over where the document is stored after it has been uploaded to conventional electronic signature service 122.

After the document has been uploaded to conventional electronic signature service 122, the originator can convert the document to an electronic signature enabled document. The originator can also specify one or more recipients designated to receive the electronic signature enabled document. Typically, conventional electronic signature service 122 emails the electronic signature enabled document in the clear to the recipients once all signers have completed adding their signatures. Such an email introduces another security weakness in this conventional workflow because the electronic signature enabled document can be intercepted.

When a recipient receives the electronic signature enabled document, he or she can affix an e-signature (or digital signature if desired) thereto to produce an e_signed document. That e_signed document can be emailed (e.g., over the clear) to the originator and the other recipients. The originator and recipients can download the e_signed document and disseminate it however they like. The ability to download and email the e_signed document introduces yet another security weakness in this conventional workflow. Embodiments discussed herein that use the CAPS scheme eliminate the security weaknesses of the conventional electronic signature workflows and provide additional protections not possible with such conventional workflows.

The CAPS scheme can enable users to utilize their existing local (with a server frontend to make it reachable from the Internet by other users) or cloud storage systems as a storage backend for the system. This way, users do not need to expose their sensitive documents (requiring electronic or digital signatures) to any cloud provider or third-party operators, thereby reducing third party risk. In addition, any documents uploaded by users can be immediately (fully or selectively) encrypted before upload and (selectively) not visible to any cloud or networking providers, thereby eliminating a potential attack vector and reducing the risk of unauthorized document disclosure.

The CAPS scheme can be run as an on-premises service if required. Users can choose to start in the cloud as a SaaS deployment and then move to an on-premises deployment or to hybrid cloud and on-premises deployment. The CAPS scheme may only require a connection to a backend storage (which can be in a public or private cloud, or on-premises). The CAPS scheme can be executed in an enterprise's public-cloud tenant (e.g., AWS) while ensuring that such a cloud provider cannot access (e.g., see) the enterprise documents and data (because the documents earmarked for e-signatures or digital signatures are encrypted at origin, stored as an encrypted asset, and transmitted as an encrypted asset, and only decrypted on user devices upon view).

The CAPS scheme can use a protection policy to selectively limit the access of approvers—individuals who are not signing the document, but who nonetheless must oversee the signature process—to content within the document to be signed. An originator can restrict parts of the documents to different individual and/or groups and/or roles on the list of approvals of the document. For example, different parts of one document need to be approved by different people, and each approver sees only parts of the document that relate to their approval. The selective disclosure is enforced if documents are downloaded or sent via email after the whole document is completely approved and finalized.

The CAPS scheme can enable users to add cryptographic signatures (by document signers not the operator of the service/system) on documents that are sent out for approval and signing.

The CAPS scheme can implement cryptographic protection to enforce selective disclosure on documents that are sent out for approval and signing. This protection can be put into place by the party generating documents to be deployed via the CAPS scheme.

After a document is approved or signed, the digital signed document is not sent in clear over email. The CAPS scheme ensures that digital signed documents are sent in a protected (encrypted) form; that is the digital signed document is encrypted before being transmitted. In addition, any protection policy assigned to the document is maintained throughout its life. For example, selective access to the document is maintained based on permissions granted before the approval. If the fully approved document is emailed, selective access is maintained to those granted access, and in the amounts of granted access, as before the final approval. As another example, the protection policy can define which portion(s) of a digital asset are encrypted or whether the entire digital asset is encrypted.

The CAPS scheme can trace all activities pertaining to the documents, even after download or if forwarded by email, since the viewing of such documents requires decryptions.

These viewing activities can be captured with intra-document event and usage tracing.

The CAPS scheme can enable timed release of information via an encryption that permits access to a document after a set duration of time or user-defined date and time. Prior to the timed release, various protective policies may be enforced (e.g., selective disclosures may apply to parts of the document).

The CAPS scheme can impose region-bound viewing and signing. For example, the originator of a document (requiring a digital signature or approval) can specify one more geographic fences (e.g., a geographic region, country, zip code, etc.) where such a document can be viewed, signed, or downloaded. Alternatively, the geographic fences can define where the document cannot be viewed, signed, or downloaded. Various techniques can be used to enforce region-based access to documents. For example, the IP address can be mapped to approved and unapproved regions. If a VPN is being used, round trip compute times can be evaluated to assess whether the user is in an approved region. If the location of the user is deemed to be in an approved region, then that user is provided with the decryption key to access the document.

The CAPS scheme can be used in many different specific use cases. A few examples are discussed. On example may involve employment contracts. An enterprise can use embodiments discussed herein to send employment contracts with sensitive personal identifying information (PII) and financial data to be signed by new employees. The sensitive PII (e.g., social security number, address, name, benefits) and financial data (salary, account number for electronic transfer) can be encrypted so that only the chosen user and HR department and IT admins in the organization can see the PII. Even when such documents are downloaded by the employee, or forwarded, the sensitive data can be protected in a way that preserves selective disclosure. Specifically, email recipients cannot see or edit the sensitive parts of the document unless they are granted permission. Another example may involve project contracts. An enterprise can use embodiments discussed herein to send projects or financial contracts to customers, partners, and suppliers. The sensitive information may be the nature of services and goods sold or bought, prices, quantities, etc. The documents may describe projects that last for several years, and compromising such documents may reveal future product plans and diminish the competitive edge of enterprises. Yet another example can involve non-disclosure agreements (NDAs). An enterprise can use embodiments discussed herein to send NDAs to be signed by collaborators and/or suppliers. NDAs may contain sensitive information that is to be discussed during a collaboration or negotiation. Other examples in which an enterprise can benefit using embodiments discussed herein include exchanging intellectual property and trade secrets, notarizing documents, documents for lawyers, accountants, and financial services organizations, and other services that require signatures, sensitive documents, and forms.

The CAPS scheme may be used for time-locked/timed-release commitments of protected documents or digital objects. For example, when the protected information or nature of provided services require guaranteed public disclosure after fixed period of elapses or at specified time, the CAPS scheme can guarantee such eventual disclosure. Examples include public audits, or accountability checks that occur ex post facto. Other examples can include marketing messages coordinated with campaigns (e.g., a specific ad related to the Super Bowl or other event). As yet another example, the entertainment industry provides review material that needs to be released to reviewers at a first time instance, but the documents are made public after an embargo period has expired.

Figure 2:
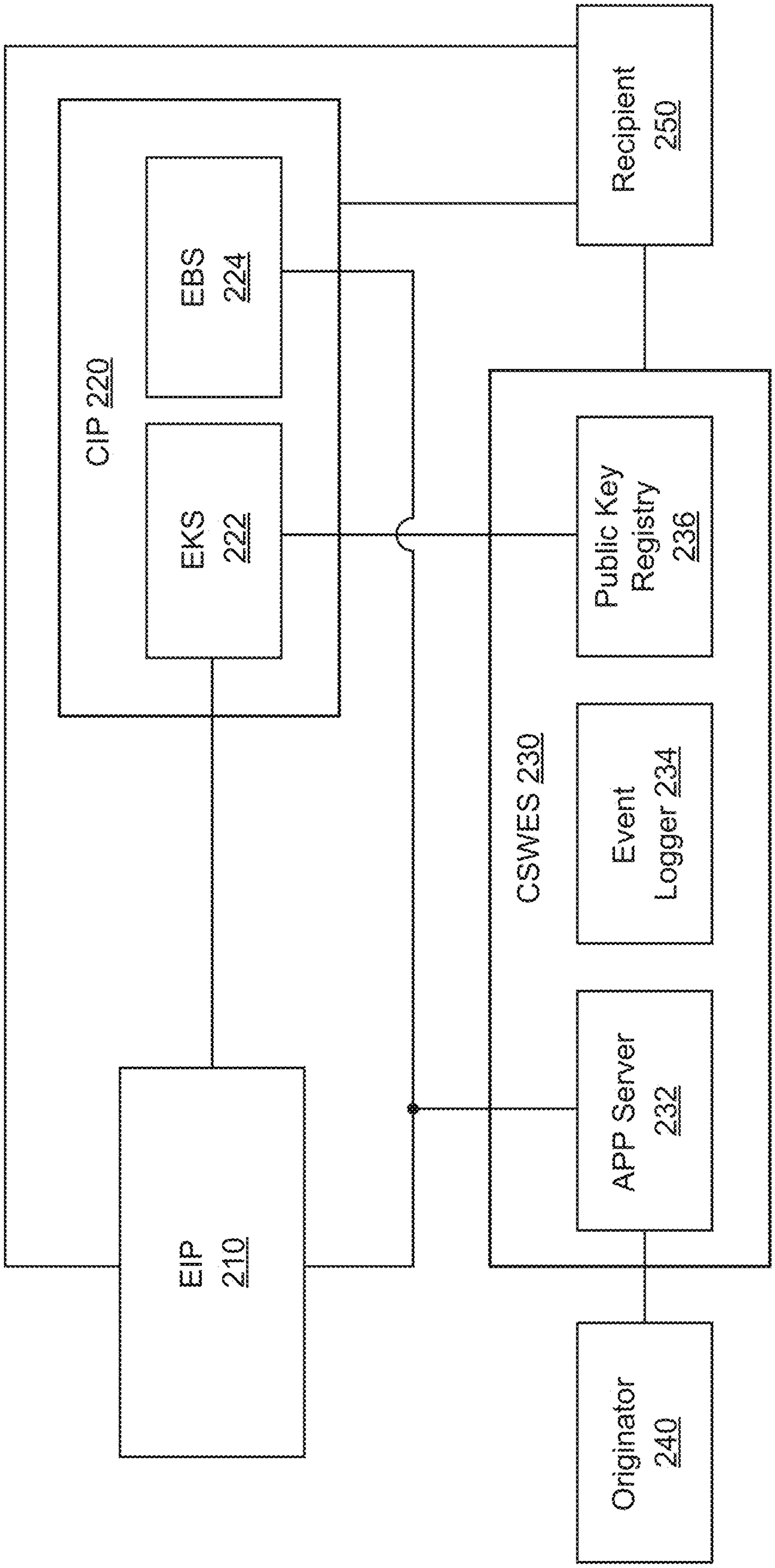
FIG. 2 shows a schematic diagram of an example system that can be used to implement a (Cryptographically Augmented Private SaaS) CAPS scheme in accordance with an embodiment.

FIG. 2 shows a schematic diagram of an example system 200 that can be used to implement a CAPS scheme in accordance with an embodiment. System 100 can include EIP 210, CIP 220, CSWES 230, Originator 240, and Recipient 250. CIP 220 can operate EKS 222 and EBS 224 as independent entities (e.g., each on its own Azure thread). CSWES 230 can include APP server 232, event logger 234, and public key registry 236. APP server 232 may provide a service that enables originator 240 to incorporate digital signature requirements and/or a protection policy to digital assets in accordance with the CAPS scheme. Event logger 234 may log every action taken with respect to digital assets managed by CSWES 320 into an event log database. Public key registry 236 may store public keys provided, for example, by EKS 222.

System 200 can be setup as follows. EIP 210 may communicate with EKS 222 via a system for cross-domain identity management (SCIM) to synchronize identities with EKS 222. EKS 222 may generate a key pair for each synchronized identity. If a hybrid or SaaS deployment is being used as part of the CAPS scheme, public keys generated for each key pair may be uploaded to public key registry 236. EBS 224 can be connected to EIP 210 and to CSWES 230 (or particularly to APP server 232). EBS 224 may enforce EBS access policies configured based on EIP identities. The access policy may also specify the level of access (e.g., read and write access) of third party services such as, for example, APP server 232. Originator 240 can interact with APP server 232 (e.g., via website hosted by an enterprise) to create templates and specify protection policies for digital assets requiring an electronic signature or a digital signature. The template can specify one or more regions of an asset that requires a signature. The template can specify one or more sections of the asset that are subject to the protection policy set for that asset and for any identities (e.g., recipients, reviewers, or approvers) selected to access the asset. For example, a recipient may be granted full viewing access to the asset, but other users may only be able to view a subset of the asset. The protection policy may also define time-lock or timed-release commitments of digital assets. For example, if time-lock or timed-release is imposed on a digital asset, a cryptographic puzzle can be used to enable CSWES 230 to commit computing resource to unlock the cryptographic puzzle. The protection policy may also define region-bound access parameters of digital assets, as discussed above. Additional information on how various protection policies can be set for a digital asset can be found in commonly owned U.S. Pat. No. 11,507,676, the disclosure of which is incorporated herein by reference in its entirety.

FIG. 2 also shows recipient 250, which represents a user identified by originator 240 to receive and digitally sign a digital asset encoded with a template and protection policy. Recipient 250 may communicate with CSWES 230, CIP 220 (or EBS 224 in particular), and EIP 210. Recipient 250 may be operating a network connected device such as a computer (e.g., desktop, laptop, tablet, or smartphone) that can run a client website thereon. The client website may be hosted by an enterprise (e.g., a client using CSWES 230) that has enabled originator 240 to prepare a digital asset via APP server 232 and to obtain encrypted digitally signed assets using a CAPS scheme embodiment discussed herein.

Figure 3:
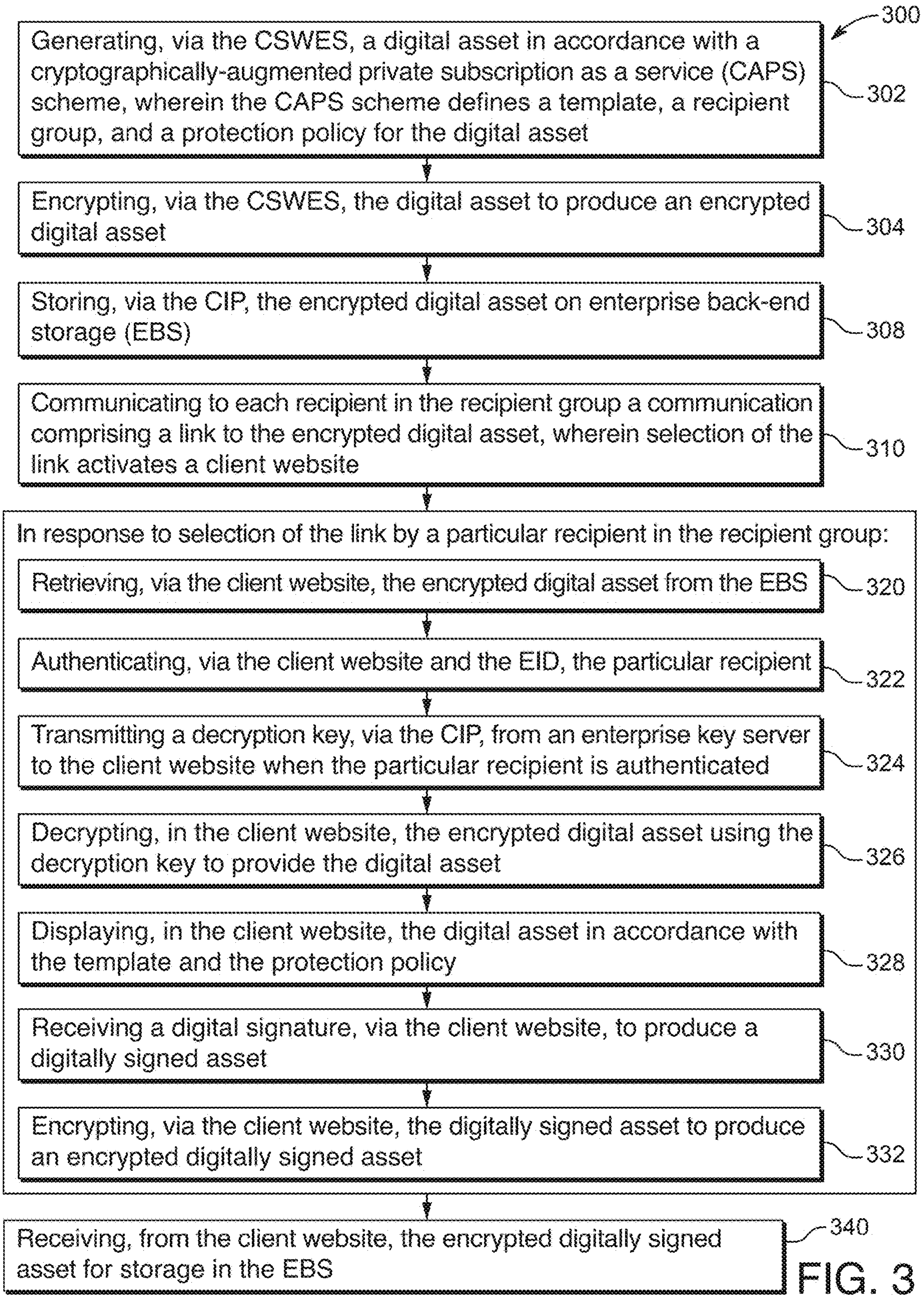
FIG. 3 shows an illustrative process according to an embodiment.
Figure 4A:
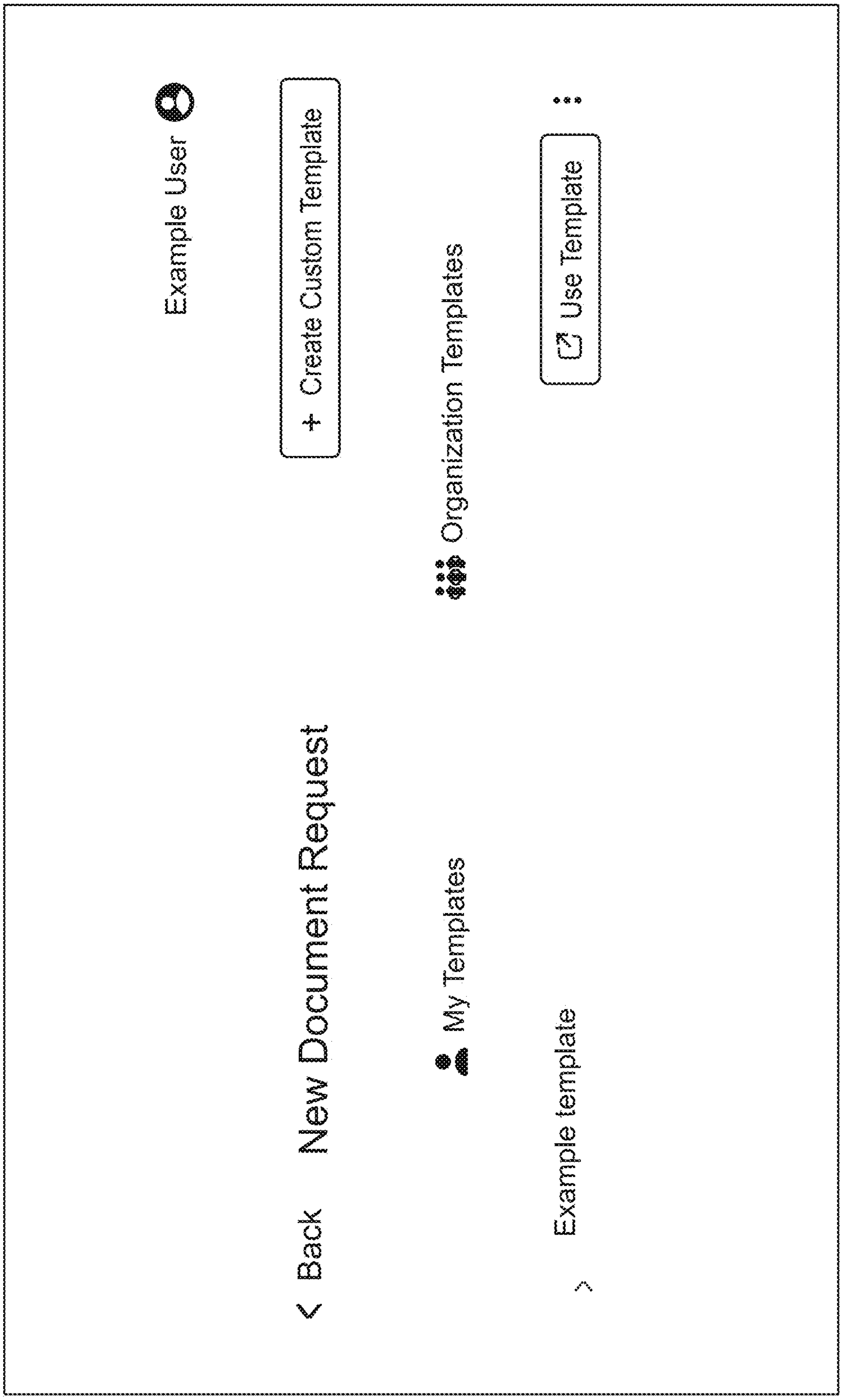
FIG. 4A-4C show illustrative screen shots according to an embodiment.
Figure 4B:
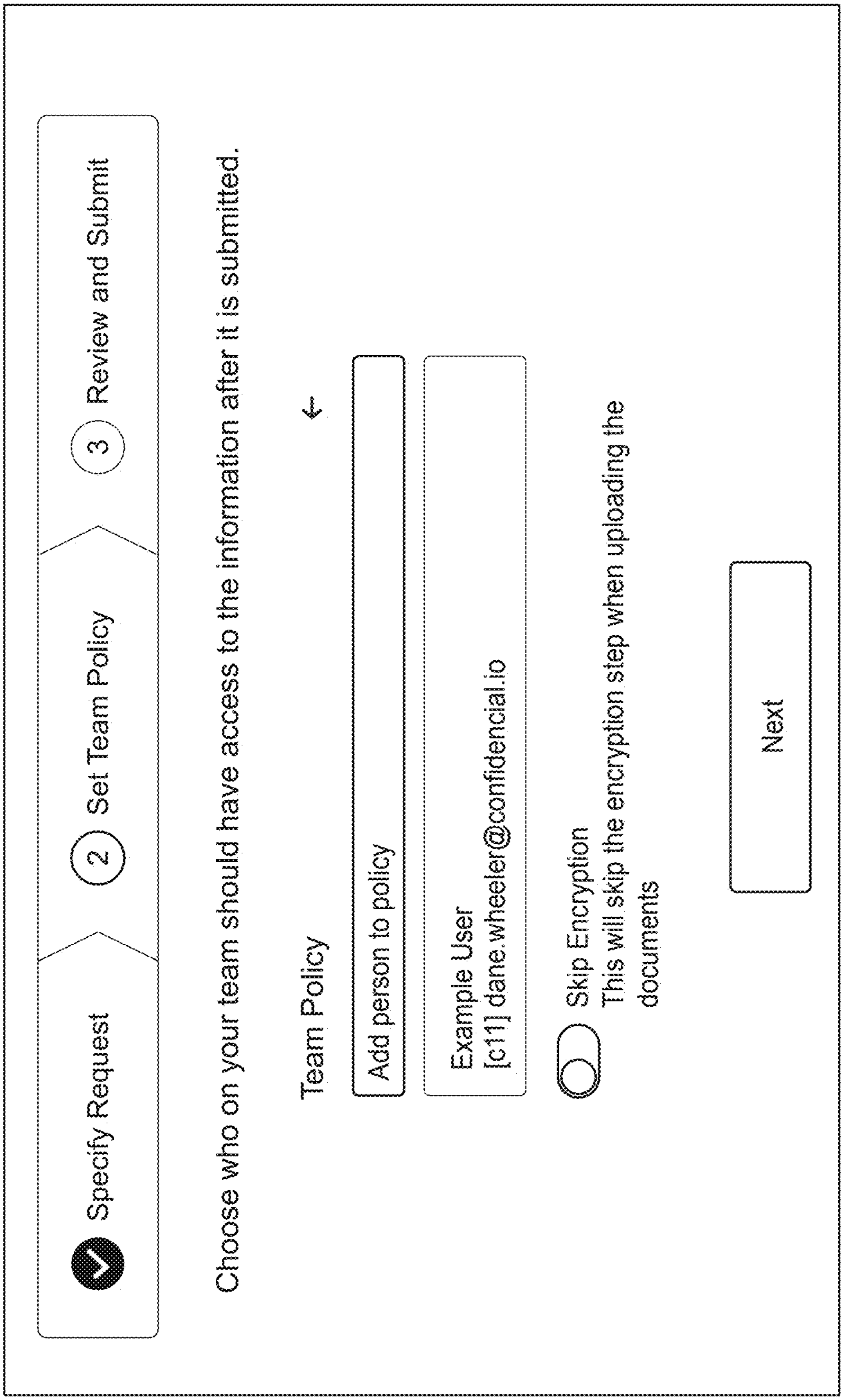

FIG. 3 shows illustrative process 300 according to an embodiment. Process 300 may be implemented in network implemented system 200, for example, that includes an EID, CIP, and a CSWES. Process 300 may begin at step 302 by generating, via the CSWES, a digital asset in accordance with a cryptographically-augmented private software as a service (CAPS) scheme, wherein the CAPS scheme defines a template, a recipient group, and a protection policy for the digital asset. An originator can create custom templates or use pre-existing templates to define different sections of the digital asset requiring a digital signature and to define the protection policy for the digital asset. FIG. 4A shows an illustrative UI screen that may be presented to an originator to create a new template or select a pre-existing template. The originator can specify recipients of the digital asset and further specify access rights each recipient has based on the protection policy. The originator can also specify reviewers and other individuals who are granted some level of access to the digital asset (based on the protection policy). For example, FIG. 4B shows an illustrative UI screen that enables the originator to specify which individuals are granted access to the digital asset. After the originator has generated the digital asset in accordance with the CAPS scheme, the digital asset can be encrypted, via the CSWES, to produce an encrypted digital asset, at step 304.

Figure 4C:
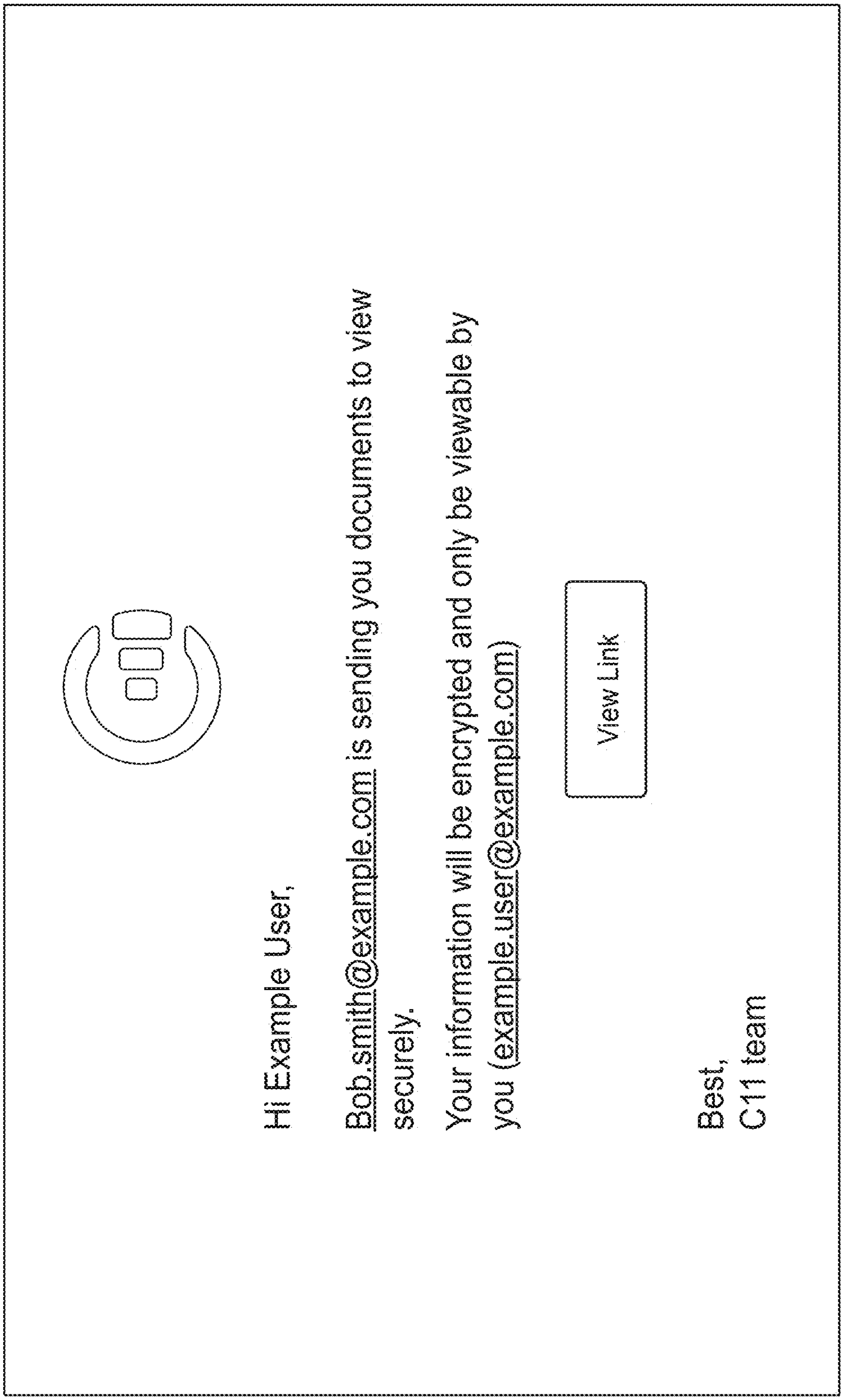

At step 308, the encrypted digital asset can be stored, via the CIP, on enterprise back-end storage (EBS). The CSWES does not actually possess the encrypted digital asset (nor the unencrypted version thereof), thereby eliminating a security issue common with conventional electronic signature services. The EBS may be affiliated with and under secure control of the enterprise enabling the originator to generate the digital asset. At step 310, process 300 can communicate to each recipient in the recipient group a communication including a link to the encrypted digital asset, wherein selection of the link activates a client website. The client website may be owned and run by the enterprise. FIG. 4C shows an illustrative email that has been sent to a recipient. The email includes a link to the encrypted digital asset.

In response to selection of the link by a particular recipient in the recipient group, process 300 may engage in a series of steps that maintain the security of the digital asset in accordance with the CAPS scheme. Starting with step 320, process 300 can retrieve, via the client website, the encrypted digital asset from the EBS. At step 322, process 300 can authenticate, via the client website and the EID, the particular recipient. For example, authentication of the recipient can be verified with the EID if the recipient has proper log in credentials with the EID. As another example, the EID can authenticate the recipient by sending a one-time passcode via an out-of-band channel (e.g., email or phone) to the recipient, which the recipient can enter in the client website. At step 324, process 300 can transmit a decryption key, via the CIP (e.g., the EKS), from an enterprise key server to the client website when the particular recipient is authenticated. In some embodiments, the CSWES (e.g., the public key registry) can provide the decryption key.

At step 326, the encrypted digital asset can be decrypted, in the client website, using the decryption key to provide the digital asset. Containing the decryption and storage of the decrypted digital asset to the volatile memory running in a computer program execution environment (e.g., JavaScript) for the client website provides an extra layer of security to prevent dissemination of unprotected digital assets. At step 328, process 300 can display, on the client website, the digital asset in accordance with the template and the protection policy. The recipient can view the digital asset in accordance with the protection policy and enter one or more digital signatures, via the client website, to produce a digitally signed asset, at step 330. At step 332, process 300 can encrypt, via the client website, the digitally signed asset to produce an encrypted digitally signed asset. Only users who possess the decryption key will be able to view the encrypted digitally signed asset.

The encrypted digitally signed asset can be received for storage in the EBS, at step 340. If desired, the encrypted digitally signed asset can be transmitted to all recipients, approvers, and other parties identified by the originator for the digital asset.

It should be understood that the steps shown in FIG. 3 are merely illustrative that additional steps may be added, that the order of the steps may be rearranged, and that some steps may be omitted. For example, an event logger may record every action taken with respect to a digital asset, encrypted digital asset, decrypted digital asset, digitally signed asset, and encrypted digitally signed asset into an event trail log. The event trail log can be audited at any time. When an audit is required, the log can be transmitted to an auditor using the CAPS scheme. In some embodiments, a search and audit feature can be provided that allows a user to search and investigate all audit events stored by CSWES that match certain criteria (e.g., date, time, event type, originator, recipients, users, etc.). Users may search based on regular expression-based pattern matching against the aforementioned criteria. For more sophisticated searches, users may define queries in a manner similar to SQL to retrieve results. The CSWES may provide pre-defined search criteria and queries for common audit and/or forensic tasks.

As another example, any originator can generate a version of the digital asset including a protection policy with a timed public release. The content available in the public release can contain any subset (including the subset containing all) of the information available to the user. Therefore, only a user with full access to the document can create a timed public release of the full document. A timed public release digital asset can be created by 1) encrypting the digital asset using a timed encryption, 2) providing the timed encryption to a designated party that designates computation resources to release the timed encryption, and 3) in response to the designated party solving the computational problem, the decrypted document is publicly released.

The CAPS scheme described herein is "infrastructure agnostic" in that it functions equally well regardless of the provider of the backend storage and/or underlying (cloud) compute infrastructure. Enterprises can use their existing infrastructure to store documents when leveraging the CAPS scheme. Thus, an archiving policy used by a CAPS scheme can be "inherited" from the archiving policy defined for the underlying data storage infrastructure. This has the advantage of not requiring administrators to define and maintain multiple archiving configurations across all their deployed systems, thereby enabling an administrator to only configure the archiving policy of their own existing storage infrastructure.

Figure 5:
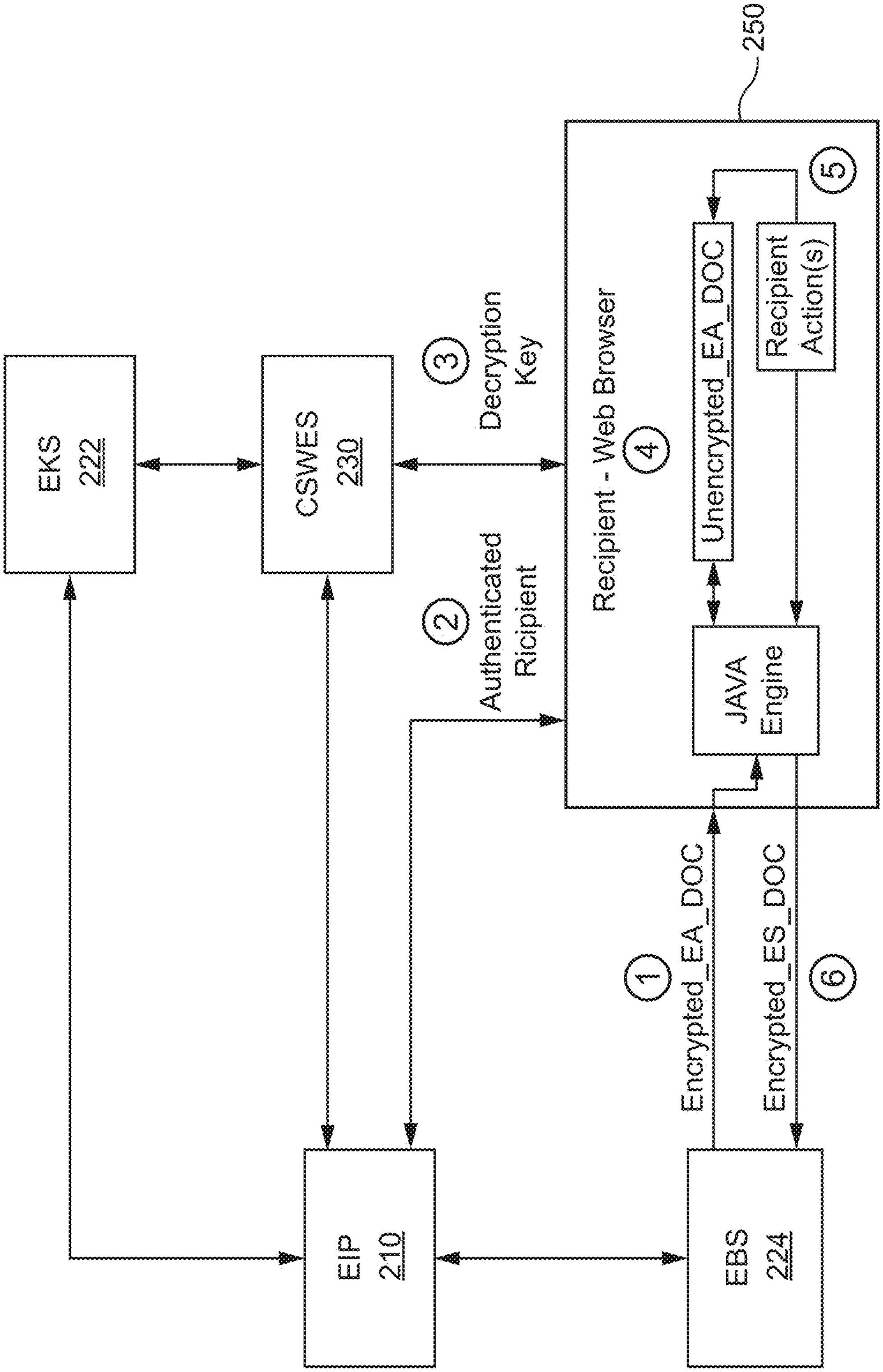
FIG. 5 shows an illustrative document workflow using the CAPS scheme in the system of FIG. 2 according to an embodiment.

FIG. 5 shows an illustrative document workflow using the CAPS scheme in system 200 according to an embodiment. The workflow illustrates 6 example steps: 1) an encrypted electronically augmented document is transmitted to a web browser running on recipient device 250; 2) recipient is authenticated; 3) a decryption key is provided to recipient device 250; 4) a javascript engine or other scripting language engine decrypts the encrypted electronically augmented document to an unencrypted electronically augmented document; 5) user imparts an electronic or digital signature to the document to create an electronically signed document; and 6) the javascript engine encrypts the electronically signed document to produce an encrypted electronically signed document.

Figure 6:
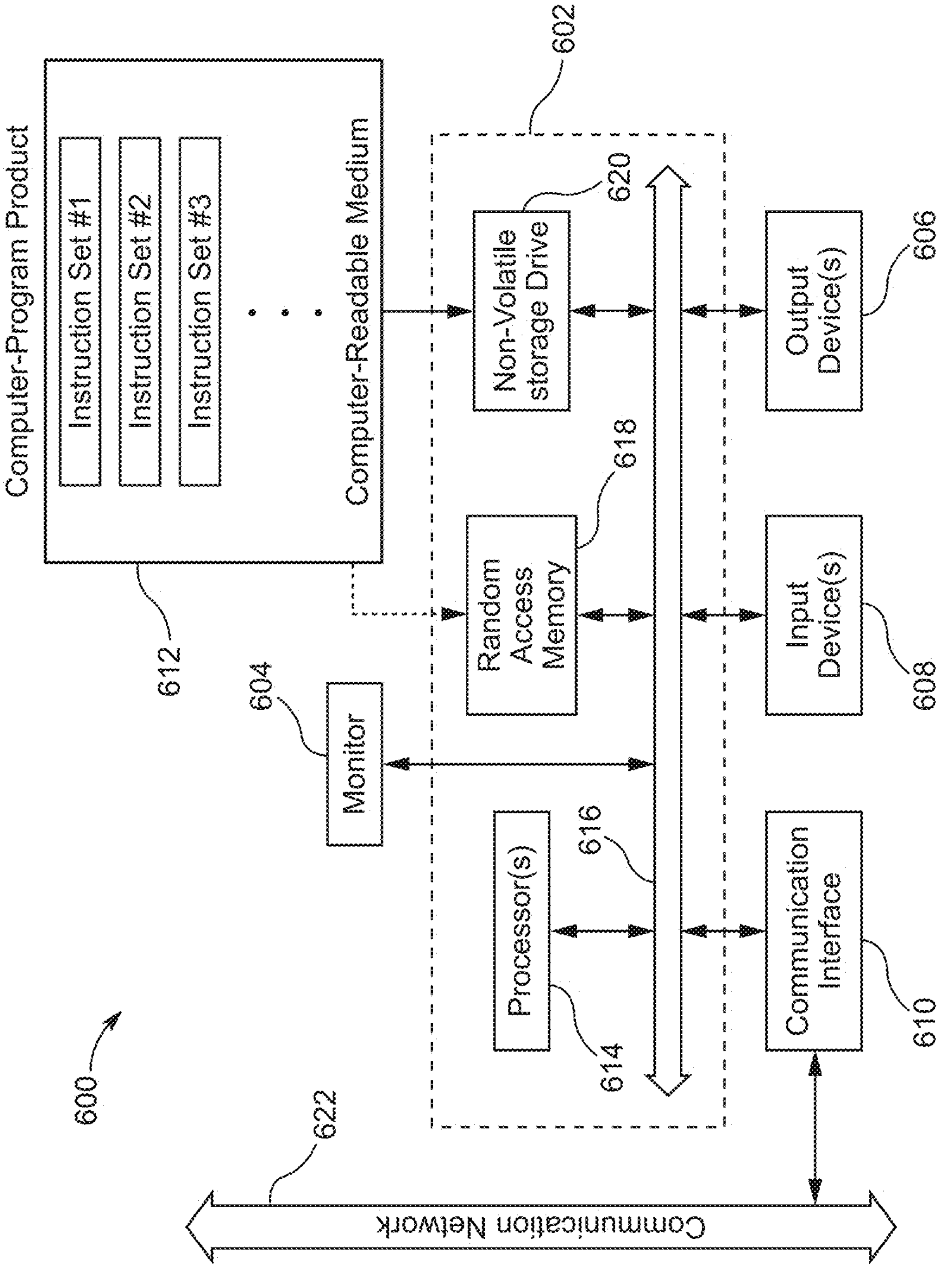
FIG. 6 is a block diagram of a special-purpose computer system according to an embodiment.

FIG. 6 is a block diagram of a special-purpose computer system 600 according to an embodiment. The methods and processes described herein may similarly be implemented by tangible, non-transitory computer readable storage mediums and/or computer program products that direct a computer system to perform the actions of the methods and processes described herein. Each such computer program product may comprise sets of instructions (e.g., codes) embodied on a computer-readable medium that directs the processor of a computer system to perform corresponding operations. The instructions may be configured to run in sequential order, or in parallel (such as under different processing threads), or in a combination thereof.

Special-purpose computer system 600 comprises a computer 602, a monitor 104 coupled to computer 602, one or more additional user output devices 606 (optional) coupled to computer 602, one or more user input devices 608 (e.g., keyboard, mouse, track ball, touch screen) coupled to computer 602, an optional communications interface 610 coupled to computer 602, and a computer program product including a tangible computer-readable storage medium 612 in or accessible to computer 602. Instructions stored on computer-readable storage medium 612 may direct system 600 to perform the methods and processes described herein. Computer 602 may include one or more processors 614 that communicate with a number of peripheral devices via a bus subsystem 616. These peripheral devices may include user output device(s) 606, user input device(s) 608, communications interface 610, and a storage subsystem, such as random access memory (RAM) 618 and non-volatile storage drive 620 (e.g., disk drive, optical drive, solid state drive), which are forms of tangible computer-readable memory.

Computer-readable medium 612 may be loaded into random access memory 618, stored in non-volatile storage drive 620, or otherwise accessible to one or more components of computer 602. Each processor 614 may comprise a microprocessor, such as a microprocessor from Intel® or Advanced Micro Devices, Inc.®, or the like. To support computer-readable medium 612, the computer 602 runs an operating system that handles the communications between computer-readable medium 612 and the above-noted components, as well as the communications between the above-noted components in support of the computer-readable medium 612. Exemplary operating systems include Windows® or the like from Microsoft Corporation, Solaris® from Sun Microsystems, LINUX, UNIX, and the like. In many embodiments and as described herein, the computer program product may be an apparatus (e.g., a hard drive including case, read/write head, etc., a computer disc including case, a memory card including connector, case, etc.) that includes a computer-readable medium (e.g., a disk, a memory chip, etc.). In other embodiments, a computer program product may comprise the instruction sets, or code modules, themselves, and be embodied on a computer-readable medium.

User input devices 608 include all possible types of devices and mechanisms to input information to computer system 602. These may include a keyboard, a keypad, a mouse, a scanner, a digital drawing pad, a touch screen incorporated into the display, audio input devices such as voice recognition systems, microphones, and other types of input devices. In various embodiments, user input devices 608 are typically embodied as a computer mouse, a trackball, a track pad, a joystick, wireless remote, a drawing tablet, a voice command system. User input devices 608 typically allow a user to select objects, icons, text and the like that appear on the monitor 604 via a command such as a click of a button or the like. User output devices 606 include all possible types of devices and mechanisms to output information from computer 602. These may include a display (e.g., monitor 604), printers, non-visual displays such as audio output devices, etc.

Communications interface 610 provides an interface to other communication networks and devices and may serve as an interface to receive data from and transmit data to other systems, WANs and/or the Internet, via a wired or wireless communication network 622. Embodiments of communications interface 610 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 610 may be coupled to a computer network, to a FireWire® bus, or the like. In other embodiments, communications interface 610 may be physically integrated on the motherboard of computer 602, and/or may be a software program, or the like.

RAM 618 and non-volatile storage drive 620 are examples of tangible computer-readable media configured to store data such as computer program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 618 and non-volatile storage drive 620 may be configured to store the basic programming and data constructs that provide the functionality of various embodiments of the present invention, as described above.

Software instruction sets that provide the functionality of the present invention may be stored in computer-readable medium 612, RAM 618, and/or non-volatile storage drive 620. These instruction sets or code may be executed by the processor(s) 614. Computer-readable medium 612, RAM 618, and/or non-volatile storage drive 620 may also provide a repository to store data and data structures used in accordance with the present invention. RAM 618 and non-volatile storage drive 620 may include a number of memories including a main random access memory (RAM) to store instructions and data during program execution and a read-only memory (ROM) in which fixed instructions are stored. RAM 618 and non-volatile storage drive 620 may include a file storage subsystem providing persistent (non-volatile) storage of program and/or data files. RAM 618 and non-volatile storage drive 620 may also include removable storage systems, such as removable flash memory.

Bus subsystem 616 provides a mechanism to allow the various components and subsystems of computer 602 communicate with each other as intended. Although bus subsystem 616 is shown schematically as a single bus, alternative embodiments of the bus subsystem may utilize multiple busses or communication paths within the computer 602.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes but is not limited to portable or fixed storage devices, optical storage devices, wireless channels, and/or various other storage mediums capable of storing that contain or carry instruction(s) and/or data.

Whereas many alterations and modifications of the present invention will no doubt become apparent to a person of ordinary skill in the art after having read the foregoing description, it is to be understood that the embodiments shown and described by way of illustration are in no way intended to be considered limiting.

Moreover, the processes described with respect to one or more of FIGS. 2-6, as well as any other aspects of the disclosure, may each be implemented by software, but may also be implemented in hardware, firmware, or any combination of software, hardware, and firmware. Instructions for performing these processes may also be embodied as machine or computer readable code recorded on a machine or computer readable medium. In some embodiments, the computer readable medium may be a nontransitory computer readable medium. Examples of such a nontransitory computer readable medium include but are not limited to a read-only memory, a random access memory, a flash memory, a CDROM, a DVD, a magnetic tape, a removable memory card, and optical data storage devices. In other embodiments, the computer readable medium may be a transitory computer readable medium. In such embodiments, the transitory computer readable medium can be distributed over network coupled computer systems so that the computer readable code is stored and executed in a distributed fashion. For example, such a transitory computer readable medium may be communicated from one electronic device to another electronic device using any suitable communications protocol. Such a transitory computer readable medium may embody computer readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of any one or more of any system, device, or server may be provided as a software construct, firmware construct, one or more hardware components, or a combination thereof, and may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of any one or more of any system device, or server are merely illustrative, and that the number, configuration, functionality, and interconnection of existing modules may be modified or omitted, additional modules may be added, and the interconnection of certain modules may be altered.

While there have been described systems, methods, and computer readable media for enabling efficient control of a media application at a media electronic device by a user electronic device, it is to be understood that many changes may be made therein without departing from the spirit and scope of the disclosure. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method implemented in a networked distributed system comprising an enterprise identity provider (EID), a cloud infrastructure provider (CIP), and a cloud signing and compute workflow enabling service (CSWES), the method comprising:

generating, via the CSWES, a digital asset in accordance with a cryptographically-augmented private software as a service (CAPS) scheme, wherein the CAPS scheme defines a template, a recipient group, and a protection policy for the digital asset;

encrypting, via the CSWES, the digital asset to produce an encrypted digital asset;

storing, via the CIP, the encrypted digital asset on enterprise back-end storage (EBS);

communicating to each recipient in the recipient group a communication comprising a link to the encrypted digital asset, wherein selection of the link activates a client website;

in response to selection of the link by a particular recipient in the recipient group:

retrieving, via the client website, the encrypted digital asset from the EBS;

authenticating, via the client website and the EID, the particular recipient;

transmitting a decryption key, via the CIP, from an enterprise key server to the client website when the particular recipient is authenticated;

decrypting, in the client website, the encrypted digital asset using the decryption key to provide the digital asset;

displaying, in the client website, the digital asset in accordance with the template and the protection policy;

receiving a digital signature, via the client website, to produce a digitally signed asset;

encrypting, via the client website, the digitally signed asset to produce an encrypted digitally signed asset;

receiving, from the client website, the encrypted digitally signed asset for storage in the EBS, wherein the protection policy comprises:

a user access policy specifying access parameters for each user in a group of users, wherein the access parameters specify protection of portions or all of the digital asset; and a timed-release protection that guarantees that the encrypted digital asset or the encrypted digitally signed asset remain secret until a user defined date and time.

2. The method of claim 1, further comprising transmitting the encrypted digitally signed asset or a link to the encrypted digitally signed asset to each recipient in the recipient group.

3. The method of claim 1, wherein the encrypted digitally signed asset is downloadable from the EBS, and wherein only authorized users in possession of a decryption key can decrypt the encrypted digitally signed asset.

4. The method of claim 1, further comprising logging every transaction pertaining to the digital asset into an audit trail log.

5. The method of claim 1, wherein the template defines at least one digital signature region to receive a digital signature.

6. The method of claim 1, wherein the protection policy comprises digital asset viewing and access rules.

7. The method of claim 1, wherein the digital asset being displayed on the client website is maintained in a volatile memory of a device running the client website.

8. The method of claim 1, wherein said authenticating the particular recipient comprises enforcing a geographical fencing policy.

9. A non-transitory computer-readable storage medium containing program instructions for a method being executed by an application, the application comprising code for one or more components that are called by the application during runtime, wherein execution of the program instructions by one or more processors of a computer system causes the one or more processors to perform steps comprising:

generating, via a cloud signing and compute workflow enabling service (CSWES), a digital asset in accordance with a cryptographically augmented private software as a service (CAPS) scheme, wherein the CAPS scheme defines a template, a recipient group, and a protection policy for the digital asset;

encrypting, via the CSWES, the digital asset to produce an encrypted digital asset;

storing, via the CIP, the encrypted digital asset on enterprise back-end storage (EBS);

communicating to each recipient in the recipient group a communication comprising a link to the encrypted digital asset, wherein selection of the link activates a client website;

in response to selection of the link by a particular recipient in the recipient group:

transmitting, from the EBS, the encrypted digital asset the client website from the EBS; and transmitting a decryption key, from an enterprise key server, to the client website when the particular recipient is authenticated, wherein the client website uses the decryption key to decrypt the encrypted digital asset to enable the particular recipient to view the digital asset in accordance with the protection policy and apply a digital signature to the digital asset to produce a digitally signed asset, and wherein the client website further encrypts the digitally signed asset to produce an encrypted digitally signed asset; and receiving, from the client website, the encrypted digitally signed asset for storage in the EBS, wherein the protection policy comprises:

a user access policy specifying access parameters for each user in a group of users, wherein the access parameters specify protection of portions or all of the digital asset; and a timed-release protection that guarantees that the encrypted digital asset or the encrypted digitally signed asset remain secret until a defined date and time.

10. The computer readable storage medium of claim 9, the method further comprising logging every transaction pertaining to the digital asset into an audit trail log.

11. The computer readable storage medium of claim 9, wherein the template defines at least one digital signature region to receive a digital signature.

12. The computer readable storage medium of claim 9, wherein the protection policy comprises digital asset viewing and access rules.

13. A system with memory comprising:

an enterprise identity provider (EID) operative to synchronize identities with an enterprise key service (EKS);

enterprise back-end storage (EBS) that operates according to policies set by the EID; and a cloud signing and compute workflow enabling service (CSWES) operative to provide a cryptographically augmented private software as a service (CAPS) scheme, wherein the CAPS scheme defines a template, a recipient group, and a protection policy for an encrypted digitally augmented asset that is securely stored on the EBS, wherein the encrypted digitally augmented asset is distributed, from the EBS, to at least one recipient in the recipient group in conjunction with a decryption key that enables a client website to decrypt the encrypted digitally augmented asset and provide access to the template in accordance with the protection policy to produce an encrypted digitally signed asset, and wherein the encrypted digitally signed asset is received from the client website for storage in the EBS, and wherein the protection policy comprises:

a user access policy specifying access parameters for each user in a group of users, wherein the access parameters specify protection of portions or all of the encrypted digitally augmented asset; and a timed-release protection that guarantees that the encrypted digitally augmented asset or the encrypted digitally signed asset remain secret until a defined date and time.

14. The system of claim 13, wherein the CSWES is operative to distribute the decryption key to the at least one recipient.

15. The system of claim 13, wherein the CSWES is operative to generate an event trail log for every transaction related to the encrypted digitally augmented asset and the encrypted digitally signed asset.

16. The system of claim 13, wherein the encrypted digitally augmented asset requires an electronic signature from the at least one recipient.

* * * * *